United States Patent
Seol et al.

(10) Patent No.: US 12,155,887 B2
(45) Date of Patent: Nov. 26, 2024

(54) IMAGE DISPLAY APPARATUS AND OPERATING METHOD THEREOF

(71) Applicant: LG ELECTRONICS INC., Seoul (KR)

(72) Inventors: Seongwoon Seol, Seoul (KR); Obong An, Seoul (KR); Hyeseung Lee, Seoul (KR); Eunyoung Cho, Seoul (KR); Sangjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/008,415

(22) PCT Filed: Jun. 4, 2020

(86) PCT No.: PCT/KR2020/007259
§ 371 (c)(1),
(2) Date: Dec. 5, 2022

(87) PCT Pub. No.: WO2021/246549
PCT Pub. Date: Dec. 9, 2021

(65) Prior Publication Data
US 2023/0232064 A1    Jul. 20, 2023

(51) Int. Cl.
*H04N 21/431*    (2011.01)
*G06V 10/70*    (2022.01)
(Continued)

(52) U.S. Cl.
CPC ........... *H04N 21/431* (2013.01); *G06V 10/70* (2022.01); *G06V 10/945* (2022.01); *G06V 10/95* (2022.01); *H04N 21/4722* (2013.01)

(58) Field of Classification Search
CPC .. H04N 21/431; H04N 21/4722; G06V 10/70; G06V 10/95; G06V 10/945
See application file for complete search history.

(56) References Cited

U.S. PATENT DOCUMENTS

| | | | |
|---|---|---|---|
| 9,113,214 B2 * | 8/2015 | Andrews, II | H04N 21/235 |
| 9,407,973 B2 * | 8/2016 | Pratt | G06F 16/904 |

(Continued)

FOREIGN PATENT DOCUMENTS

| | | |
|---|---|---|
| EP | 2613549 | 7/2013 |
| JP | 2006-301856 | 11/2006 |

(Continued)

OTHER PUBLICATIONS

PCT International Application No. PCT/KR2020/007259, International Search Report dated Feb. 26, 2021, 5 pages.

(Continued)

*Primary Examiner* — Nnenna N Ekpo
(74) *Attorney, Agent, or Firm* — LEE, HONG, DEGERMAN, KANG & WAIMEY

(57) ABSTRACT

The present disclosure relates to an image display apparatus and an operating method thereof. The image display device according to an embodiment of the present disclosure includes a display; a network interface unit that performs communication through a network; and a controller, wherein the controller generates data for a screen output through the display, when a preset user input is received while a first content is output through the display, obtains data, which corresponds to data of the screen, that is related to an object included in the screen, from a first server through the network interface unit, determines at least one first object related to a position corresponding to the user input, among object included in the screen, based on the data that is related to the object, and outputs a user interface (UI) for the at least one first object through the display. Various other embodiments are possible.

18 Claims, 14 Drawing Sheets

(51) Int. Cl.
    *G06V 10/94*     (2022.01)
    *H04N 21/4722*     (2011.01)

(56) References Cited

U.S. PATENT DOCUMENTS

| | | |
|---|---|---|
| 2011/0131605 A1 | 6/2011 | Pratt et al. |
| 2011/0181779 A1 | 7/2011 | Park et al. |
| 2018/0199101 A1 | 7/2018 | Kim |
| 2019/0158922 A1 | 5/2019 | Weinstein-Weaver |
| 2020/0196015 A1* | 6/2020 | Pate .................. G06V 10/82 |

FOREIGN PATENT DOCUMENTS

| | | |
|---|---|---|
| KR | 10-2010-0002759 | 1/2010 |
| KR | 10-2011-0076089 | 7/2011 |
| KR | 10-2013-0081595 | 7/2013 |

OTHER PUBLICATIONS

European Patent Office Application Serial No. 20939311.5, Search Report dated Mar. 12, 2024, 8 pages.

* cited by examiner

IMAGE DISPLAY APPARATUS AND OPERATING METHOD THEREOF

CROSS-REFERENCE TO RELATED APPLICATIONS

This application is the National Stage filing under 35 U.S.C. 371 of International Application No. PCT/KR2020/007259, filed on Jun. 4, 2020, the contents of which are all incorporated by reference herein in their entirety.

TECHNICAL FIELD

The present disclosure relates to an image display apparatus and an operating method thereof.

BACKGROUND ART

An image display apparatus is a device having a function of displaying an image that a user can watch, and a user can watch a broadcast through the image display apparatus. For example, the image display apparatus may include a Television (TV), a monitor, a projector, and the like that have a liquid crystal display LCD using a liquid crystal or an OLED display using an organic light emitting diode OLED.

Recently, a digital TV service using a wired or wireless network communication network has become common, and the digital TV service provides various services that cannot be provided by an existing analog broadcasting service. Among them, an Electronic Program Guide (EPG) service is a service that provides a guide screen so that a user can watch broadcast information of various channels at a glance by disposing broadcast programs that are being aired or scheduled to be aired on each channel in chronological order.

Recently, a service that provides information on a person or product included in a specific screen of content output through an image display apparatus is also provided by using an electronic program guide (EPG). For example, a service in which information on a person or product is mapped to each time point of a corresponding timeline to form a database by using a timeline for a specific program included in an electronic program guide (EPG), and when a user requests information on a person or product included in a screen at a specific time point, the image display apparatus provides information on the person or product mapped at a corresponding time is provided.

However, due to the circumstances of a broadcasting company, there are frequent cases where an error occurs between the actual start time of a program and the previously scheduled start time. In this case, a screen scheduled to be output on the timeline of the electronic program guide (EPG) at a specific time point and a screen actually output through the image display apparatus may be different from each other. Accordingly, even if a user requests information on a person or product included in a screen at a specific time point, a problem may occur in that information completely unrelated to a person or product included in a screen that the user is watching is provided.

In addition, considering the error that may occur between the actual start time of the program and the previously scheduled start time, all of the information on a person or product mapped at a certain time, before and after a user requests information on a person or product included in the screen, may be comprehensively provided. However, there is a problem in that the accuracy of the information provided to the user is significantly lowered.

Meanwhile, when a user requests information on a person or product included in a screen at a specific time point, an object included in a corresponding screen is generally identified using object recognition technology, and information corresponding to the identified object is provided. However, as in the prior art, when all information of a person or product mapped at a certain time around a specific time point is comprehensively provided, there is a problem that the computational load for object recognition increases in identifying all objects included in the screen because there are too many and various identification objects. Further, in the case of simply increasing the level of object identification to improve the accuracy of object recognition, the computational load for object recognition inevitably increases exponentially.

DISCLOSURE

Technical Problem

The present disclosure has been made in view of the above problems, and provides an image display apparatus capable of accurately providing information on a corresponding screen when a user requests information on an object included in a screen at a specific time point, and an operating method thereof.

The present disclosure further provides an image display apparatus capable of identifying an object included in a screen more quickly, and quickly and accurately providing information corresponding to the identified object, when a user requests information on the object included in the screen at a specific time point, and an operating method thereof.

Technical Solution

In an aspect, there is provided an image display apparatus unit, the apparatus including: a display; a network interface unit that performs communication through a network; and a controller, wherein the controller generates data for a screen output through the display, when a preset user input is received while a first content is output through the display, obtains data, which corresponds to data of the screen, that is related to an object included in the screen, from a first server through the network interface unit, determines at least one first object related to a position corresponding to the user input, among object included in the screen, based on the data that is related to the object, and outputs a user interface (UI) for the at least one first object through the display.

In another aspect, there is provided a method of operating an image display apparatus, the method including: obtaining data for a screen output through a display of the image display apparatus, when a preset user input is received while a first content is output through the display; obtaining data, which corresponds to data of the screen, that is related to an object included in the screen, from a first server through a network interface unit of the image display apparatus; determining at least one first object related to a position corresponding to the user input, among object included in the screen, based on the data that is related to the object; and outputting a user interface (UI) for the at least one first object through the display.

Advantageous Effects

Effects of the image display apparatus and the operating method thereof according to the present disclosure will be described below.

According to various embodiments of the present disclosure, when a user requests information on an object included in a screen at a specific time point, information mapped to a specific time point of the electronic program guide (EPG) is not simply provided, but data for the screen at the specific time point is generated, and data on object included in the screen is acquired in various ways. Accordingly, even if an error occurs between the time when the content is actually output through the image display apparatus and the time scheduled in the timeline of the electronic program guide (EPG), information on the screen can be provided accurately.

In addition, according to various embodiments of the present disclosure, whenever content is output through an image display apparatus, an optimal learning model corresponding to a corresponding content is received from a server and stored, and when a user requests information on an object included on a screen at a specific time point, an object recognition is performed using a learning model corresponding to the corresponding content. Accordingly, information corresponding to the identified object can be quickly provided, and the load of computation for object recognition can be reduced by identifying objects included in the screen more quickly.

A further scope of the applicability of the present disclosure will become apparent from the detailed description that follows. However, since various changes and modifications within the spirit and scope of the present disclosure can be clearly understood by those skilled in the art, it should be understood that the detailed description and specific examples such as preferred embodiments of the present disclosure are given as examples only.

MODE FOR INVENTION

Figure 1:
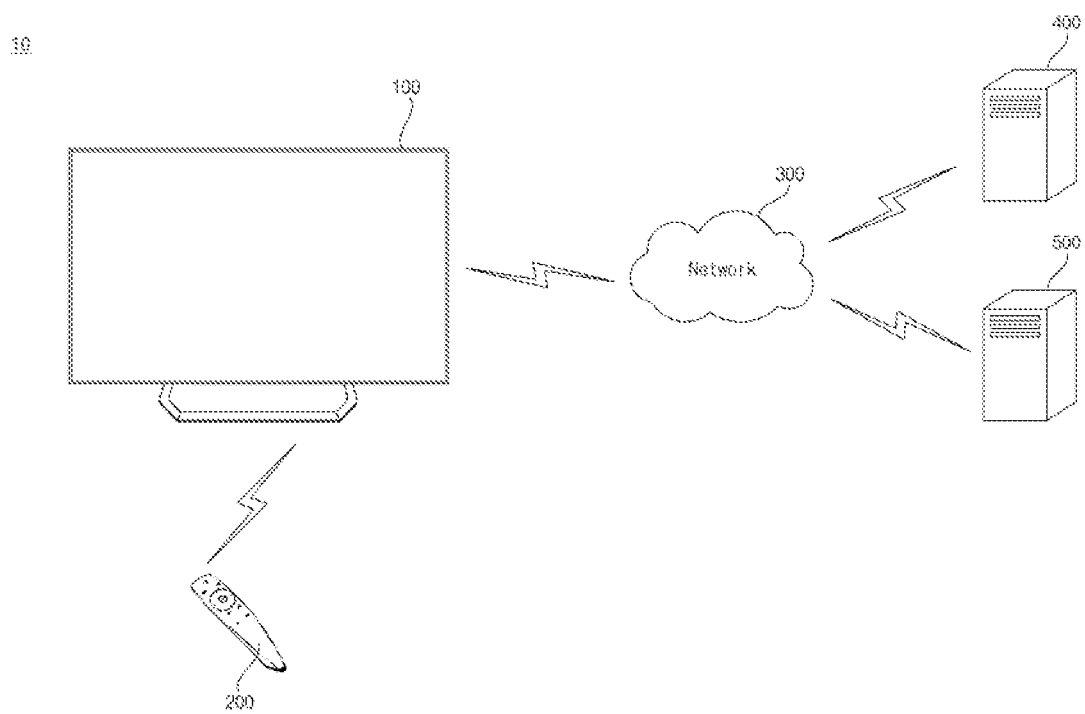
FIG. 1 is a diagram illustrating a system according to an embodiment of the present disclosure.

Reference will now be made in detail to the embodiments of the present disclosure, examples of which are illustrated in the accompanying drawings. To clearly and briefly describe the present disclosure, a part without concerning to the description is omitted in the drawings, and the same or like reference numerals in the specification denote the same elements.

The suffixes "module" and "unit" of elements herein are used for convenience of description and thus may be used interchangeably and do not have any distinguishable meanings or functions. Thus, the "module" and the "unit" may be interchangeably used.

Throughout this specification, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

It will be understood that, although the terms "first", "second", "third" etc. may be used herein to describe various elements, these elements should not be limited by these terms. These terms are only used to distinguish one element from another element.

FIG. 1 is a diagram illustrating a system, according to various embodiments of the present disclosure.

Referring to FIG. 1, a system 10 may include an image display apparatus 100, a remote control device 200, and/or at least one server 400, 500.

The image display apparatus 100 may be a device that processes and outputs an image. The image display apparatus 100 is not particularly limited as long as it can output a screen corresponding to an image signal, such as a TV, a notebook computer, and a monitor.

The image display apparatus 100 may receive a broadcast signal, process it, and output a signal-processed broadcast image. When the image display apparatus 100 receives a broadcast signal, the image display apparatus 100 may correspond to a broadcast receiving apparatus.

The image display apparatus 100 may receive a broadcast signal wirelessly through an antenna, or may receive a broadcast signal by wire through a cable. For example, the image display apparatus 100 may receive a terrestrial broadcast signal, a satellite broadcast signal, a cable broadcast signal, an Internet Protocol Television (IPTV) broadcast signal, and the like.

The remote control device 200 may be connected to the image display apparatus 100 by wire and/or wirelessly to provide various control signals to the image display apparatus 100. At this time, the remote control device 200 may include a device that establishes a wired or wireless network with the image display apparatus 100, and transmits various control signals to the image display apparatus 100 through the established network, or receives a signal related to various operations processed by the image display apparatus 100 from the image display apparatus 100.

For example, various input devices such as a mouse, a keyboard, a space remote control, a trackball, and a joystick may be used as the remote control device 200.

The image display apparatus 100 may be connected to only a single remote control device 200 or simultaneously connected to two or more remote control devices 200, thereby changing an object displayed on a screen or adjusting the state of a screen, based on a control signal provided from each remote control device 200.

The image display apparatus 100 may transmit and receive data to and from at least one server 400, 500 via a network 300 such as the Internet.

The server 400, 500 may transmit and receive data to and from the image display apparatus 100 through the network 300, and process data received from the image display apparatus 100.

The server 400, 500 may be located in the same or similar area or in areas separated from each other. For example, the server 400, 500 may be implemented in a single server, or may be implemented in a first server 400 and a second server 500 that are separated from each other.

Figure 2:
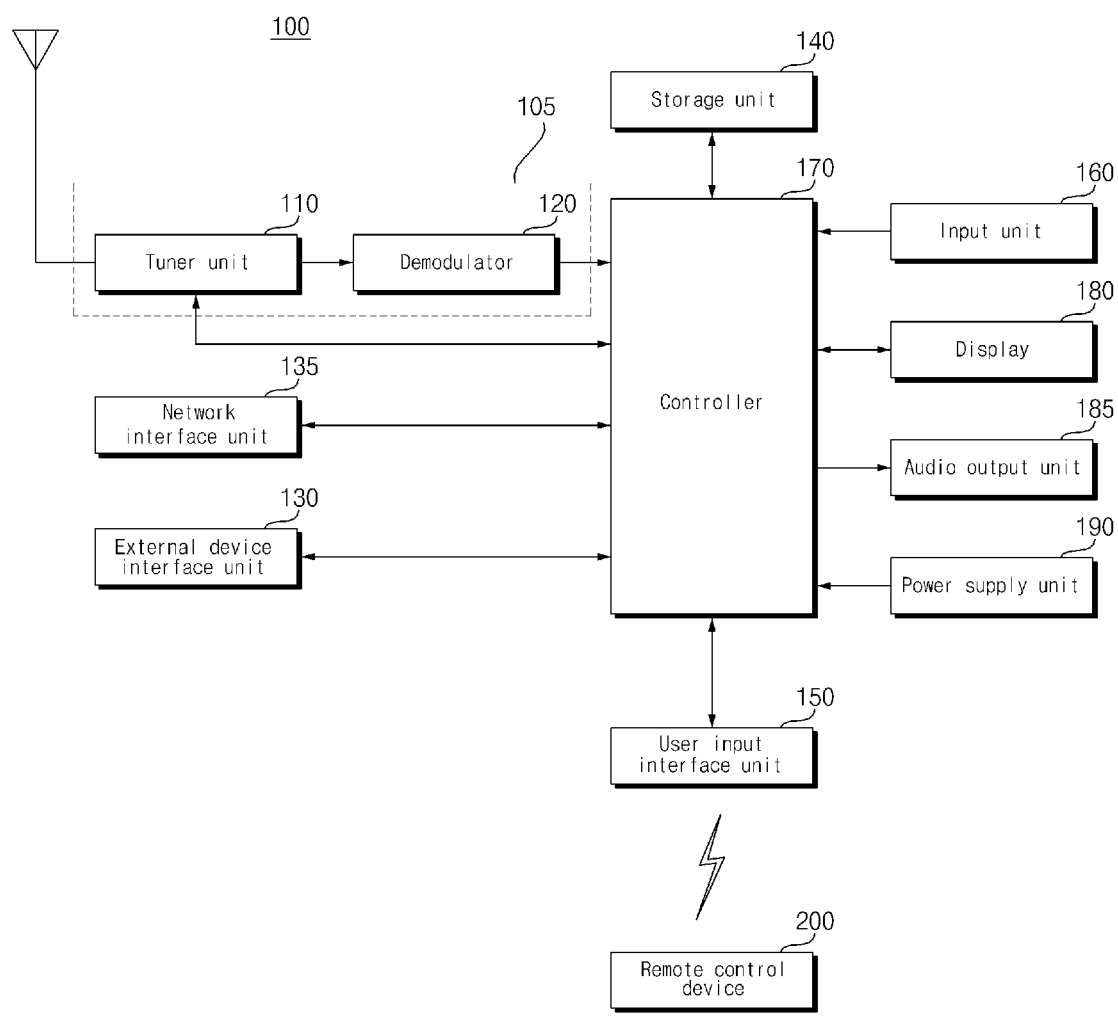
FIG. 2 is an example of an internal block diagram of an image display apparatus of FIG. 1.

FIG. 2 is an internal block diagram of the image display apparatus of FIG. 1.

Referring to FIG. 2, the image display apparatus 100 may include a broadcast receiving unit 105, an external device interface unit 130, a network interface unit 135, a storage unit 140, a user input interface unit 150, an input unit 160, a controller 170, a display 180, an audio output unit 185, and/or a power supply unit 190.

The broadcast receiving unit 105 may include a tuner unit 110 and a demodulator 120.

Meanwhile, unlike the drawing, it is also possible that the image display apparatus 100 includes only a broadcast receiving unit 105 and an external device interface unit 130, among the broadcast receiving unit 105, the external device interface unit 130, and the network interface unit 135. That is, the image display apparatus 100 may not include the network interface unit 135.

The tuner unit 110 may select a broadcast signal corresponding to a channel selected by a user or all pre-stored channels, among broadcast signals received through an antenna (not shown) or a cable (not shown). The tuner unit 110 may convert the selected broadcast signal into an intermediate frequency signal, a baseband image, or a voice signal.

For example, the tuner unit 110 may convert the selected broadcast signal into a digital IF signal (DIF) when the selected broadcast signal is a digital broadcast signal, and may convert the selected broadcast signal into an analog baseband image or voice signal (CVBS/SIF) when the selected broadcast signal is an analog broadcast signal. That is, the tuner unit 110 may process a digital broadcast signal or an analog broadcast signal. The analog baseband image or voice signal (CVBS/SIF) output from the tuner unit 110 may be directly input to the controller 170.

Meanwhile, the tuner unit 110 may sequentially select broadcast signals of all broadcast channels stored through a channel storage function among the received broadcast signals, and convert them into an intermediate frequency signal, a baseband image, or a voice signal.

Meanwhile, the tuner unit 110 may include a plurality of tuners in order to receive broadcast signals of a plurality of channels. Alternatively, a single tuner that simultaneously receives broadcast signals of a plurality of channels is also possible.

The demodulator 120 may receive the digital IF signal (DIF) converted by the tuner unit 110 and perform a demodulation operation.

The demodulator 120 may output a stream signal TS after performing demodulation and channel decoding. In this case, the stream signal may be a signal obtained by multiplexing an image signal, a voice signal, or a data signal.

The stream signal output from the demodulator 120 may be input to the controller 170. After performing demultiplexing and image/voice signal processing, the controller 170 may output an image through the display 180 and output a voice through the audio output unit 185.

The external device interface unit 130 may transmit or receive data with a connected external device. To this end, the external device interface unit 130 may include an A/V input/output unit (not shown).

The external device interface unit 130 may be connected to an external device such as a Digital Versatile Disk (DVD), Blu-ray, game device, camera, camcorder, computer (laptop), and set-top box, by wire/wireless, and may perform an input/output operation with the external device.

In addition, the external device interface unit 130 may receive a control signal related to the operation of the image display apparatus 100 from the remote control device 200, or may transmit data related to the operation of the image display apparatus 100 to the remote control device 200, by establishing a communication network with various remote control devices 200 as shown in FIG. 1.

The A/V input/output unit may receive image and voice signals from an external device. For example, the A/V input/output unit may include an Ethernet terminal, a USB terminal, a Composite Video Banking Sync (CVBS) terminal, a component terminal, an S-video terminal (analog), a Digital Visual Interface (DVI) terminal, a High a Definition Multimedia Interface (HDMI) terminal, a Mobile High-definition Link (MHL) terminal, a RGB terminal, a D-SUB terminal, an IEEE 1394 terminal, an SPDIF terminal, a Liquid HD terminal, and the like. A digital signal input through these terminals may be transmitted to the controller 170. In this case, the analog signal input through the CVBS terminal and the S-video terminal may be converted into a digital signal through an analog-to-digital converter (not shown) and transmitted to the controller 170.

The external device interface unit 130 may include a wireless communication unit (not shown) for short-range wireless communication with other electronic device. Through this wireless communication unit, the external device interface unit 130 may exchange data with an adjacent a mobile terminal. For example, the external device interface unit 130 may receive device information, executing application information, application image, and the like from a mobile terminal in a mirroring mode.

The external device interface unit 130 may perform short-range wireless communication by using Bluetooth, Radio Frequency Identification (RFID), Infrared Data Association (IrDA), Ultra-Wideband (UWB), ZigBee, and the like.

The network interface unit 135 may provide an interface for connecting the image display apparatus 100 to a wired/wireless network including an Internet network.

The network interface unit 135 may include a communication module (not shown) for connection with the wired/wireless network 300. For example, the network interface unit 135 may include a communication module for Wireless LAN (WLAN) (Wi-Fi), Wireless broadband (Wibro), World interoperability for microwave access (Wimax), High Speed Downlink Packet Access (HSDPA), and the like.

The network interface unit 135 may transmit or receive data with other user or other electronic device, through a connected network or other network linked to the connected network.

The network interface unit 135 may receive web content or data provided by a content provider or network operator. That is, the network interface unit 135 may receive web contents such as movie, advertisement, game, VOD, and broadcast signal provided from a content providers or network provider through a network, and information related thereto.

The network interface unit 135 may receive an update file and update information of firmware provided by a network operator, and transmit data to Internet or a content provider or a network operator.

The network interface unit 135 may select and receive a desired application from among applications open to the public, through a network.

The storage unit 140 may store a program for each signal processing and control in the controller 170, or may store a signal-processed image, voice, or data signal. For example, the storage unit 140 may store application programs designed for the purpose of performing various tasks that can be processed by the controller 170, and upon request of the controller 170, may selectively provide some of the stored application programs.

The program stored in the storage unit 140 is not particularly limited as long as it can be executed by the controller 170.

The storage unit 140 may perform a function for temporarily storing an image, voice, or data signal received from an external device through the external device interface unit 130.

The storage unit 140 may store information on a certain broadcast channel through a channel storage function such as a channel map.

The storage unit 140 may store at least one object-related learning model pre-learned through machine learning such as deep learning. Here, the object-related learning model may be a learning model that identifies at least one object included in the image and determines the type of the object. For example, the object-related learning model may include a person-related learning model, a clothing-related learning model, a furniture-related learning model, a sporting goods-related learning model, an optical character recognition (OCR)-related learning model for letters, numbers, symbols, and the like, depending on the type of object.

Meanwhile, machine learning means that a computer learns through data without a person directly instructing the computer on logic, and through this, the computer solves a problem. Deep learning is a method of teaching the thinking method of a person to a computer based on Artificial Neural Networks (ANN), and means an artificial intelligence technology that enables a computer to learn like a human for itself. An artificial neural network (ANN) may be implemented in a software form or a hardware form such as a chip. For example, the artificial neural network (ANN) may include various types of algorithms such as Deep Neural Network (DNN), Convolutional Neural Network (CNN), Recurrent Neural Networks (RNN), and Deep Belief Network (DBN).

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of a volatile memory (e.g. DRAM, SRAM, SDRAM, etc.), a non-volatile memory (e.g. a flash memory, a hard disk drive (HDD), or a solid state drive (SSD), etc.). In various embodiments of the present disclosure, the storage unit 140 and the memory may be used interchangeably.

The user input interface unit 150 may transmit a signal input by a user to the controller 170, or may transmit a signal from the controller 170 to a user.

For example, the user input interface unit 150 may transmit/receive a user input signal such as power on/off, channel selection, and screen setting from the remote control device 200, may transmit a user input signal input from a local key (not shown) such as a power key, a channel key, a volume key, and a setting value to the controller 170, may transmit a user input signal input from a sensor unit (not shown) that senses a user's gesture to the controller 170, or may transmit a signal from the controller 170 to the sensor unit.

The input unit 160 may be provided in one side of the main body of the image display apparatus 100. For example, the input unit 160 may include a touch pad, a physical button, and the like.

The input unit 160 may receive various user commands related to the operation of the image display apparatus 100, and may transmit a control signal corresponding to the input command to the controller 170.

The input unit 160 may include at least one microphone (not shown), and may receive a voice through the microphone.

The controller 170 may include at least one processor, and may control the overall operation of the image display apparatus 100 by using the processor included therein. Here, the processor may be a general processor such as a central processing unit (CPU). Obviously, the processor may be a dedicated device such as an ASIC or other hardware-based processor.

The controller 170 may generate and output a signal for an image or voice output by demultiplexing a stream input through the tuner unit 110, the demodulator 120, the external device interface unit 130, or the network interface unit 135, or processing the demultiplexed signals.

The display 180 converts an image signal, a data signal, an OSD signal, a control signal processed by the controller 170, or an image signal, a data signal, and a control signal received from the external device interface unit 130 to generate a driving signal.

The display 180 may include a display panel (not shown) provided with a plurality of pixels.

The plurality of pixels provided in the display panel may include RGB sub-pixels. Alternatively, the plurality of pixels provided in the display panel may include a sub-pixel of RGBW. The display 180 may generate a driving signal for a plurality of pixels by converting an image signal, a data signal, an OSD signal, a control signal, etc. processed by the controller 170.

The display 180 may be a plasma display panel (PDP), a liquid crystal display (LCD), an organic light emitting diode (OLED), a flexible display, and the like, and a three-dimensional display (3D display) may be possible. The 3D display 180 may be divided into a non-glasses type and a glasses type.

Meanwhile, the display 180 may be configured as a touch screen, and used as an input device in addition to an output device.

The audio output unit 185 receives the voice-processed signal from the controller 170 and outputs it as a voice.

The image signal processed by the controller 170 may be input to the display 180 and displayed as an image corresponding to a pertinent image signal. In addition, the image signal processed by the controller 170 may be input to an external output device through the external device interface unit 130.

The voice signal processed by the controller 170 may be outputted as an audio to the audio output unit 185. In addition, the voice signal processed by the controller 170 may be input to an external output device through the external device interface unit 130.

Although not shown in FIG. 2, the controller 170 may include a demultiplexer, an image processor, a mixer, a frame rate conversion unit, a formatter, an audio processing unit, a data processing unit, and the like.

In addition, the controller 170 may control overall operations in the image display apparatus 100. For example, the controller 170 may control the tuner unit 110 to tune a channel selected by a user or a broadcast corresponding to a pre-stored channel.

In addition, the controller 170 may control the image display apparatus 100 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may enable a certain 2D object to be displayed in the image displayed on the display 180. For example, the object may be at least one of an accessed web screen (newspaper, magazine, etc.), an electronic program guide (EPG), various menus, a widget, an icon, a still image, a moving picture, and a text.

Meanwhile, the image display apparatus 100 may further include a photographing unit (not shown). The photographing unit may photograph a user. The photographing unit may be implemented with a single camera, but is not limited thereto, and may be implemented with a plurality of cameras. Meanwhile, the photographing unit may be embedded in the image display apparatus 100 in the upper portion of the display 180 or may be disposed separately. Image information photographed by the photographing unit may be input to the controller 170.

The controller 170 may recognize the position of a user, based on the image photographed by the photographing unit. For example, the controller 170 may determine the distance (z-axis coordinate) between a user and the image display apparatus 100. In addition, the controller 170 may determine the x-axis coordinates and the y-axis coordinates in the display 180 corresponding to the user's position.

The controller 170 may detect the user's gesture based on each or a combination of an image photographed by the photographing unit or a signal sensed from the sensor unit.

The power supply unit 190 may supply a corresponding power throughout the image display apparatus 100. In particular, it may supply power to the controller 170 that can be implemented in the form of a system on chip (SOC), the display 180 for displaying an image, and the audio output unit 185 for outputting audio.

Specifically, the power supply unit 190 may include a converter (not shown) that converts AC power into DC power, and a Dc/Dc converter (not shown) that converts the level of DC power.

The remote control device 200 may transmit a user input to the user input interface unit 150. To this end, the remote control device 200 may use Bluetooth, Radio Frequency (RF) communication, Infrared Radiation communication, Ultra-wideband (UWB), ZigBee method, etc. In addition, the remote control device 200 may receive an image, voice, or data signal output from the user input interface unit 150, and display it in the remote control device 200 or output as a voice.

Meanwhile, the above-described image display apparatus 100 may be a digital broadcasting receiver capable of receiving a fixed type or mobile type digital broadcasting.

Meanwhile, the block diagram of the image display apparatus 100 shown in FIG. 2 is just a block diagram for an embodiment of the present disclosure, and each component of the block diagram may be incorporated, added, or omitted according to the specifications of the image display apparatus 100 actually implemented.

That is, two or more components may be combined into a single component, or a single component may be subdivided into two or more components as needed. In addition, the function performed in each block is for explaining the embodiment of the present disclosure, and a specific operation or device does not limit the scope of the present disclosure.

Figure 3A:
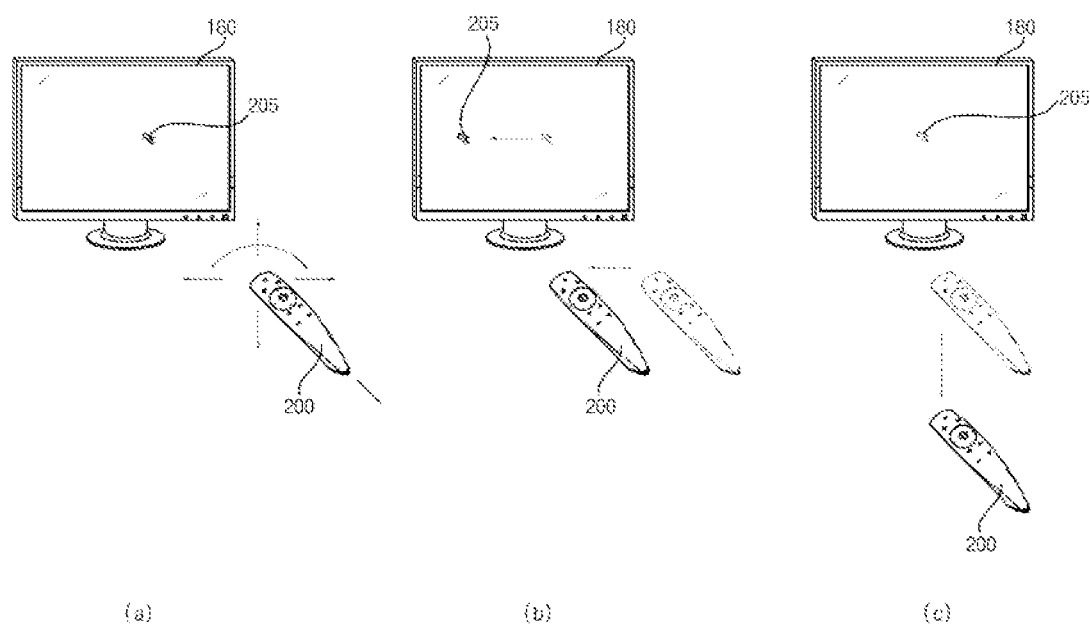
FIG. 3A is a diagram illustrating a control method of a remote control device of FIG. 2.
Figure 3B:
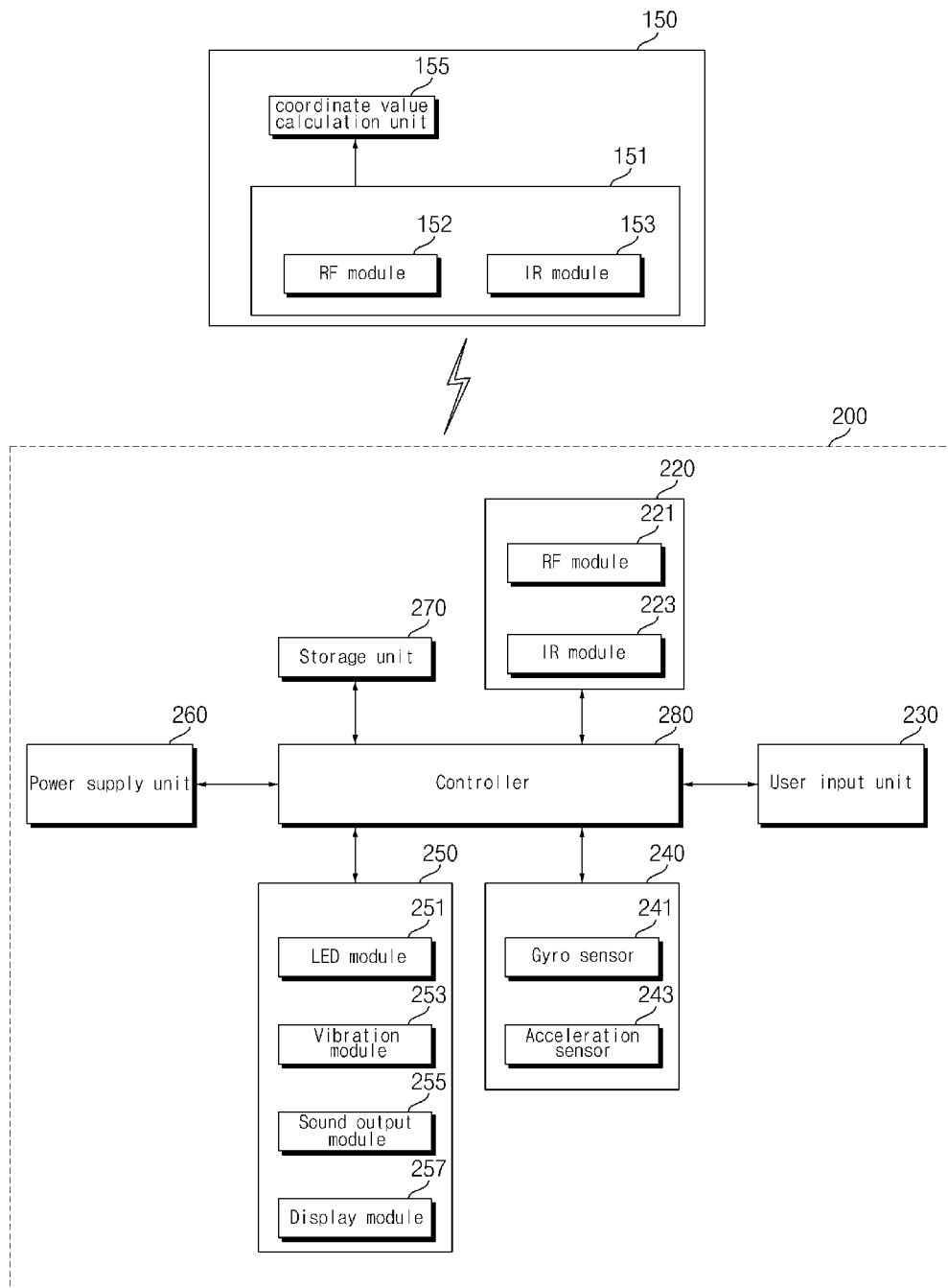
FIG. 3B is an example of an internal block diagram of the remote control device of FIG. 2.

FIG. 3A is a diagram illustrating a control method of a remote control device of FIG. 2, and FIG. 3B is an example of an internal block diagram of the remote control device of FIG. 2.

Referring to FIG. 3A, it can be seen that a pointer 205 corresponding to the remote control device 200 is displayed on the display 180 of the image display apparatus 100.

Referring to FIG. 3A(a), a user may move or rotate the remote control device 200 up-down, left-right, forward and backward. At this time, the pointer 205 displayed on the display 180 of the image display apparatus 100 may be displayed in response to the movement of the remote control device 200. Since a corresponding pointer 205 is moved and displayed according to movement in a 3D space, as shown in the drawing, such a remote control device 200 may be named as a space remote control or a 3D pointing device.

Referring to FIG. 3A(b), when a user moves the remote control device 200 to the left, it can be seen that the pointer 205 displayed on the display 180 of the image display apparatus 100 also moves to the left in response to the movement of the remote control device 200. Information on the movement of the remote control device 200 detected through the sensor of the remote control device 200 may be transmitted to the image display apparatus 100. The image display apparatus 100 may calculate the coordinates of the pointer 205 from information on the movement of the remote control device 200. The image display apparatus 100 may display a pointer 205 corresponding to the calculated coordinates.

Referring to FIG. 3A(c), in a state of pressing a specific button provided in the remote control device 200, a user may move the remote control device 200 away from the display 180. Accordingly, a selection area in the display 180 corresponding to the pointer 205 may be zoomed-in and displayed enlarged. Conversely, in a state of pressing a specific button provided in the remote control device 200, when a user moves the remote control device 200 closer to the display 180, the selection area in the display 180 corresponding to the pointer 205 may be zoomed-out and displayed reduced.

Meanwhile, when the remote control device 200 moves away from the display 180, the selected area may be zoomed-out, and when the remote control device 200 moves closer to the display 180, the selected area may be zoomed-in.

Meanwhile, in a state in which a user presses a specific button in the remote control device 200, the recognition of vertical and horizontal movements may be excluded. That is, when the remote control device 200 moves away from or approaches the display 180, the up, down, left, and right movements are not recognized, and only forward and backward movements may be recognized. In a state in which the user does not press a specific button in the remote control device 200, only up, down, left, and right movements of the remote control device 200 can be recognized, and accordingly, only the pointer 205 can be moved.

Meanwhile, the moving speed or moving direction of the pointer 205 may correspond to the moving speed or moving direction of the remote control device 200.

Referring to FIG. 3B, the remote control device 200 may include a wireless communication unit 220, a user input unit 230, a sensor unit 240, an output unit 250, a power supply unit 260, a storage unit 270, and/or a controller 280. The wireless communication unit 220 may transmit and receive signals to and from the image display apparatus 100. In this embodiment, the remote control device 200 may include an RF module 221 capable of transmitting and receiving signals to and from the image display apparatus 100 according to radio frequency (RF) communication standards. In addition, the remote control device 200 may include an IR module 223 capable of transmitting and receiving signals to and from the image display apparatus 100 according to infrared radiation (IR) communication standards.

The remote control device 200 may transmit a signal including information on the movement of the remote control device 200 to the image display apparatus 100 through the RF module 221. The remote control device 200 may receive a signal transmitted by the image display apparatus 100 through the RF module 221.

The remote control device 200 may transmit commands related to power on/off, channel change, volume change, etc. to the image display apparatus 100 through the IR module 223.

The user input unit 230 may include a keypad, a button, a touch pad, a touch screen, and the like. A user may input a command related to the image display apparatus 100 to the remote control device 200 by operating the user input unit 230. When the user input unit 230 includes a hard key button, a user may input a command related to the image display apparatus 100 to the remote control device 200 through a push operation of the hard key button.

If the user input unit 230 has a touch screen, a user may input a command related to the image display apparatus 100 to the remote control device 200 by touching a soft key on a touch screen.

Meanwhile, the user input unit 230 may include various types of input means that a user can operate, such as a scroll key or a jog key, and the present embodiment does not limit the scope of the present disclosure.

The sensor unit 240 may include a gyro sensor 241 or an acceleration sensor 243. The gyro sensor 241 may sense the movement of the remote control device 200.

The gyro sensor 241 may sense information on the operation of the remote control device 200 based on x, y, and z axes. The acceleration sensor 243 may sense information on the moving speed of the remote control device 200, and the like. Meanwhile, the sensor unit 240 may further include a distance measurement sensor capable of sensing a distance to the display 180.

The output unit 250 may output an image or voice signal corresponding to operation of the user input unit 230 or a signal transmitted from the image display apparatus 100. Through the output unit 250, a user can recognize whether the user input unit 230 is operated or whether the image display apparatus 100 is controlled.

The output unit 250 may include an LED module 251 including at least one light emitting device (e.g., Light Emitting Diode (LED)), a vibration module 253 that generates a vibration, a sound output module 255 that outputs sound, and/or a display module 257 that outputs an image.

The power supply unit 260 may supply power to each component provided in the remote control device 200. The power supply unit 260 may include at least one battery (not shown).

When the movement of the remote control device 200 is not detected for a certain time through the sensor unit 240, the power supply unit 260 may stop supplying power to each component provided in the remote control device 200, thereby preventing unnecessary power consumption.

When a certain event occurs, the power supply unit 260 may resume supplying power to each component provided in the remote control device 200. For example, the power supply unit 260 may resume power supply to each component, when a certain key provided in the remote control device 200 is operated. For example, when the movement of the remote control device 200 is detected through the sensor unit 240, the power supply unit 260 may resume supplying power to each component provided in the remote control device 200.

The storage unit 270 may store various types of programs, application data, and the like necessary for controlling or operating the remote control device 200.

When the remote control device 200 wirelessly transmits and receives signals through the image display apparatus 100 and the RF module 221, the remote control device 200 and the image display apparatus 100 may transmit and receive signals through a certain frequency band. The controller 280 of the remote control device 200 may store information related to a frequency band that can wirelessly transmit/receive signals with the image display apparatus 100 paired with the remote control device 200 in the storage unit 270 and be referenced.

The controller 280 may include at least one processor, and may control the overall operation of the remote control device 200 by using the processor included therein.

The controller 280 may transmit a control signal corresponding to a certain key operation of the user input unit 230 or a control signal corresponding to the movement of the remote control device 200 sensed by the sensor unit 240 to the image display apparatus 100 through the wireless communication unit 220.

The user input interface unit 150 of the image display apparatus 100 may include a wireless communication unit 151 capable of transmitting and receiving signals wirelessly with the remote control device 200, and a coordinate value calculation unit 155 capable of calculating coordinate values of a pointer corresponding to the operation of the remote control device 200.

The user input interface unit 150 may transmit and receive signals wirelessly with the remote control device 200 through a RF module 152. In addition, it may receive a signal transmitted by the remote control device 200 according to the IR communication standard through an IR module 153.

The coordinate value calculation unit 155 may calculate the coordinate value (x, y) of the pointer 205 to be displayed on the display 170 by correcting hand shake or error, from the signal corresponding to the operation of the remote control device 200 received through the wireless communication unit 151.

A transmission signal of the remote control device 200 input to the image display apparatus 100 through the user input interface unit 150 may be transmitted to the controller 180 of the image display apparatus 100. The controller 180 of the image display apparatus 100 may determine information related to the operation and key operation of the remote control device 200 from the signal transmitted from the remote control device 200, and correspondingly, may control the image display apparatus 100.

As another example, the remote control device 200 may calculate a pointer coordinate value corresponding to the operation, and output it to the user input interface unit 150 of the image display apparatus 100. In this case, the user input interface unit 150 of the image display apparatus 100 may transmit information on the received pointer coordinate value to the controller 180 without a separate process for hand shake or error correction. In addition, as another example, unlike the drawing, the coordinate value calculation unit 155 may be provided inside the controller 170, not in the user input interface unit 150.

Figure 4A:
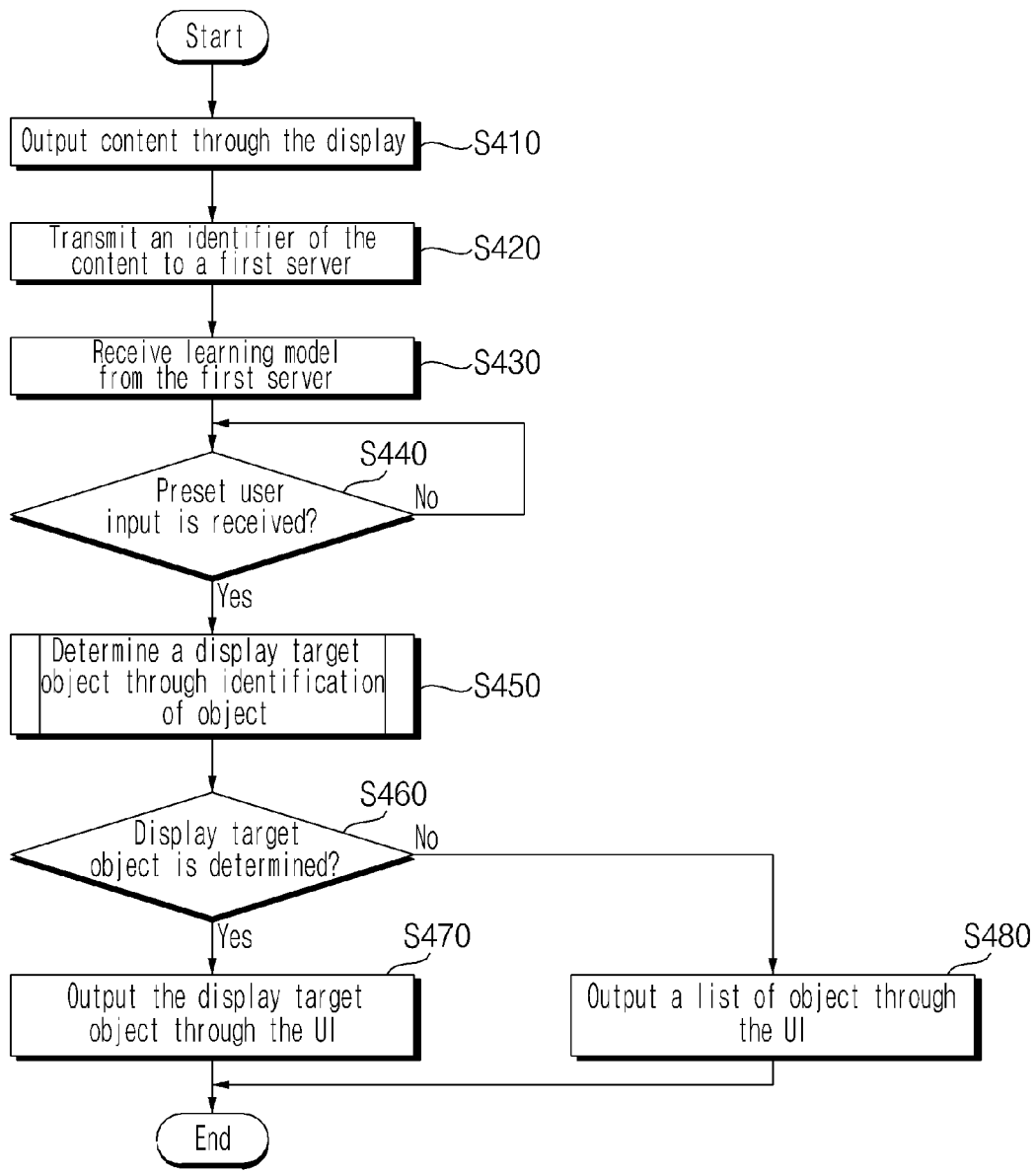
FIGS. 4A and 4B are flowcharts of a method of operating the image display apparatus according to an embodiment of the present disclosure.
Figure 4B:
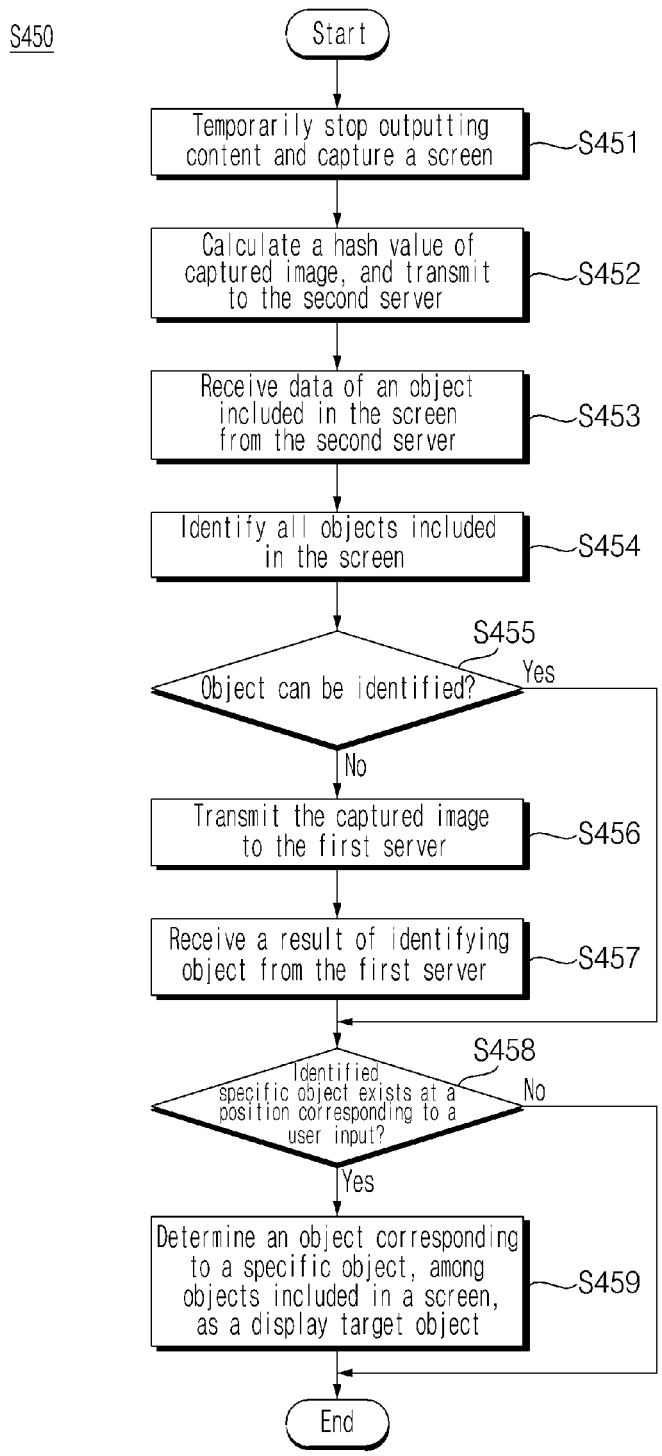

FIGS. 4A and 4B are flowcharts of a method of operating an image display apparatus according to an embodiment of the present disclosure, and FIGS. 5A to 8B are diagrams for explaining a method of operating the image display apparatus of FIGS. 4A and 4B.

Referring to FIG. 4A, the image display apparatus 100 may output content through the display 180, at operation S410. For example, the image display apparatus 100 may receive and process any one of a terrestrial broadcasting signal, a satellite broadcasting signal, a cable broadcasting signal, and an IPTV broadcasting signal, and output signal-processed broadcasting content.

At operation S420, the image display apparatus 100 may transmit an identifier of the content to a first server 400, when the content is output through the display 180. Here, the identifier of the content may be unique information (e.g. title, number) corresponding to each content, but is not limited thereto, and may be a characteristic (e.g. genre) of each content.

Meanwhile, the first server 400 may be a server that provides a learning model for an object, and when an identifier of content is received from the image display apparatus 100, at least one learning model corresponding to the identifier of the content may be determined. For example, when the genre of the content is transmitted to the first server 400 as the identifier of the content, the first server 400 may determine a learning model mapped to the genre of the content.

In this case, if the genre of the content is a drama, a learning model for a person, a learning model for clothing, and/or a learning model for furniture may be determined as a learning model corresponding to an identifier of content, and if the genre of content is sports and golf, a learning model for a person, a learning model for clothing, and/or a learning model for sporting goods may be determined as a learning model corresponding to an identifier of content.

The image display apparatus 100 may receive at least one learning model corresponding to the identifier of the content from the first server 400, at operation S430. In addition, the image display apparatus 100 may store at least one learning model received from the first server 400 in the storage unit 140. At this time, if the learning model corresponding to the identifier of other content is previously stored in the first server 400, the learning model corresponding to the identifier of other content is deleted, and at least one learning model received from the first server 400 may be stored in the storage unit 140.

The image display apparatus 100 may check whether a preset user input is received while content is being output through the display 180, at operation S440. For example, the image display apparatus 100 may check whether a preset long press input that a user presses a specific button (e.g. a home button) provided in the user input unit 230 of the remote control device 200 for a certain period of time or longer is received through the user input interface unit 150 while content is being output through the display 180.

At operation S450, when a preset user input is received while content is being output through the display 180, the image display apparatus 100 may determine at least one object (hereinafter, a display target object) related to a preset user input through identification of object included in a screen. Here, the display target object may mean an object related to information displayed through a user interface (UI) output in response to a preset user input. In this regard, it will be described with reference to FIG. 4B.

Referring to FIG. 4B, at operation S451, when a preset user input is received while content is being output through the display 180, the image display apparatus 100 may capture a screen being displayed through the display 180.

Here, the operation of capturing the screen may mean an operation of obtaining data (hereinafter, frame data) for a frame of content output through the screen. Meanwhile, when a preset user input is received, the image display apparatus 100 may temporarily stop outputting content through the display 180, and may continuously output an image corresponding to the captured screen.

At operation S452, the image display apparatus 100 may calculate a hash value of an image corresponding to the captured screen, and may transmit the calculated hash value to the second server 500 by using a certain hash function. Here, the certain hash function may mean a function that maps data of an arbitrary length to data of a fixed length for the purpose of efficient data management, and the hash value of the image may mean a result value obtained by inputting data corresponding to the image to a hash function.

Meanwhile, the second server 500 may be a server that stores various data related to content. For example, the second server 500 may store a plurality of hash values mapped to each screen frame constituting the content and data of an object mapped to each hash value. Here, the data of the object may be data including various information on an object included in a screen. For example, the data of the object mapped to the hash value may include the name and type (e.g. person, clothing, furniture, sports equipment) of each object included in the screen corresponding to the hash value, thumbnail image of each object, and Uniform Resource Locator (URL) of a web page corresponding to each object, and the like.

The image display apparatus 100 may receive data of an object corresponding to a hash value of an image corresponding to the captured screen from the second server 500, at operation S453. That is, when a hash value is received from the image display apparatus 100, the second server 500 may check the received hash value among the hash values mapped to each screen frame constituting the content, and may transmit data of an object mapped to a corresponding hash value to the image display apparatus 100.

In this case, the data for the object mapped to the hash value of the image corresponding to the screen may be data that more closely matches the screen being watched by a viewer, compared to data simply mapped to the timeline of the electronic program guide (EPG). In this regard, it will be described with reference to FIGS. 5A to 5C.

Figure 5A:
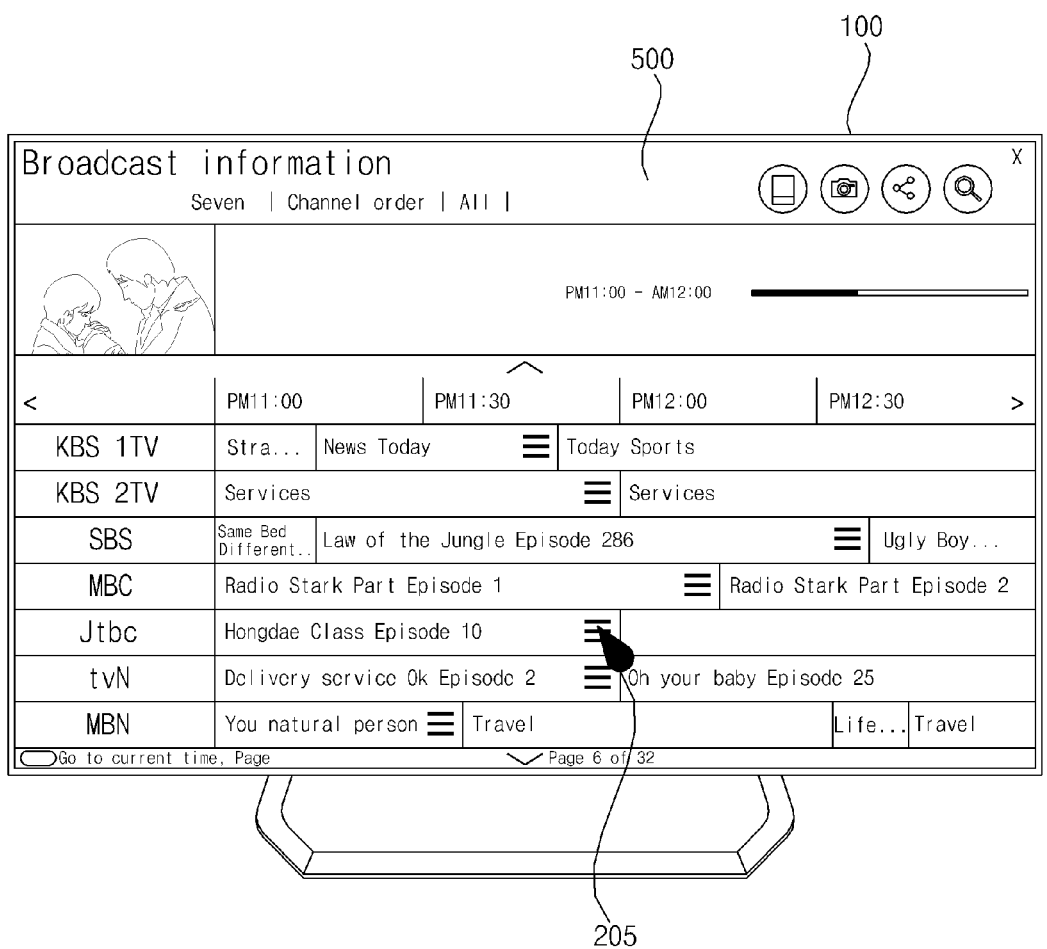
FIGS. 5A to 8B are diagrams for explaining a method of operating the image display apparatus of FIGS. 4A and 4B.

Referring to FIG. 5A, the image display apparatus 100 may output an electronic program guide (EPG) screen 500, and a user may check the timeline for broadcast contents currently being broadcast or scheduled to be broadcast in each channel through the electronic program guide (EPG) screen 500.

Figure 5B:
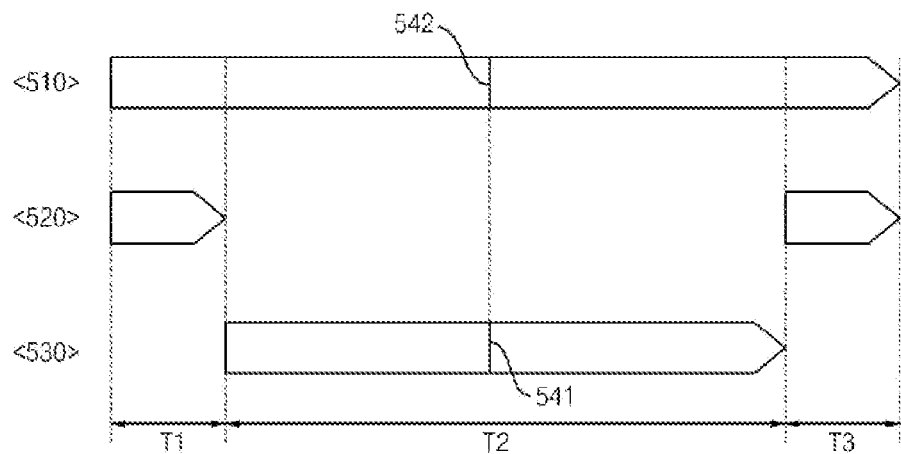
Figure 5C:
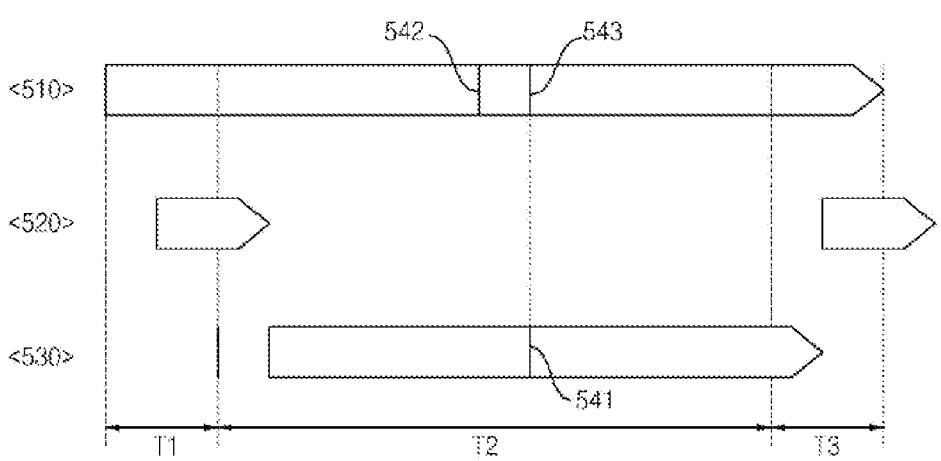

Meanwhile, referring to FIGS. 5B and 5C, a timeline 510 for specific content included in the electronic program guide (EPG), and an actual timeline 520 in which advertisement is output through the image display apparatus 100 and an actual timeline 530 in which specific content is output may be compared.

The timeline 510 for specific content included in the electronic program guide (EPG) may include both an advertisement output time T1, T3 and a specific content output time T2.

At this time, as shown in FIG. 5B, when the image display apparatus 100 accurately outputs advertisement and specific content according to the timeline of the electronic program guide (EPG), it can be checked that no error occurs between a time point 541 when a specific screen is output from the image display apparatus 100 and a time point 542 when a specific screen is previously scheduled to be output.

On the other hand, as shown in FIG. 5C, if an error occurs between the actual start time at which advertisement is output through the image display apparatus 100 and the start time previously scheduled in the timeline of the electronic program guide (EPG), it can be checked that an error occurs between the time point 541 when a specific screen is output from the image display apparatus 100 and the time point 542 when a specific screen is previously scheduled to be output, and it can be checked that the time point 541 when a specific screen is output from the image display apparatus 100 corresponds to the time point 543 when a completely different screen is scheduled to be output in the timeline of the electronic program guide (EPG).

That is, according to various embodiments of the present disclosure, even if an error occurs between the time when the image display apparatus 100 outputs a specific screen and the time when the specific screen is scheduled to be output in the timeline of the electronic program guide (EPG), the image display apparatus 100 obtains data of an object mapped to a hash value of an image corresponding to a screen being actually displayed, so that information on a corresponding screen may be more accurately provided to a user.

Meanwhile, in this drawing, although it is described that the image display apparatus 100 transmits a hash value of the image corresponding to the captured screen to the second server 500, and data of an object mapped to the hash value is received from the second server 500, the present disclosure is not limited thereto. For example, the image display apparatus 100 may receive metadata including hash values mapped to each screen frame constituting content and data of an object mapped to each hash value from the second server 500, and may extract data of object mapped to a corresponding hash value by checking the hash value of the image corresponding to the captured screen from the metadata.

Referring back to FIG. 4B, at operation S454, the image display apparatus 100 may identify objects included in the screen, respectively, based on at least one learning model stored in the storage unit 140. For example, when the learning model stored in the storage unit 140 is a person-related learning model and a clothing-related learning model, the image display apparatus 100 may identify an object corresponding to a person and an object corresponding to clothing, among objects included in a screen.

In this case, the learning model provided from the first server 400 and stored in the storage unit 140 may be a learning model that identifies the type of an object included in a screen. That is, when the image display apparatus 100 uses a learning model for a person provided from the first server 400, it is only identified whether an object included in a screen is a person, but it is not determined what kind of person the object is. Meanwhile, when identifying each object included in a screen, the image display apparatus 100 may create a coordinate area on a screen corresponding to each identified object.

At operation S455, the image display apparatus 100 may determine whether an object included in a screen can be identified. For example, if the image display apparatus 100 identifies objects included in a screen by using the learning model related to a person and the learning model related to clothing, and at least one object identified as a person or clothing exists on the screen, it can be determined that the object included in a screen can be identified.

At operations S456 and S457, when it is impossible to identify an object included in a screen, the image display apparatus 100 may transmit an image corresponding to the captured screen to the first server 400, and may receive data on a result of identifying each object included in the screen from the first server 400. Meanwhile, according to various embodiments of the present disclosure, the image display apparatus 100 may omit operations S456 and S457.

At operation S458, the image display apparatus 100 may check whether the identified specific object exists at a position on the screen corresponding to a user input, based on a result of identifying each object included in the screen. For example, when the image display apparatus 100 identifies an object included in a screen by using a learning model for a person and a learning model for clothing, it may be determined whether an object corresponding to a person or an object corresponding to clothing exists at a position on a screen corresponding to a user input. At this time, the image display apparatus 100 may check whether an identified specific object exists at a position on the screen corresponding to the user input, based on whether the position on the screen corresponding to the user input is included in a coordinate area on screen corresponding to each object included in the screen.

At operation S459, when an identified specific object exists at a position on a screen corresponding to a user input, the image display apparatus 100 may determine an object corresponding to a specific object, among objects included in a screen, as a display target object.

For example, when an object corresponding to a person exists at a position on a screen corresponding to a user input, the image display apparatus 100 may determine all objects corresponding to a person included in a screen as a display target object.

For example, when an object corresponding to a letter, number, and/or symbol exists at a position on a screen corresponding to user input, the image display apparatus 100 may determine an object whose name includes a corresponding letter, number, and/or symbol, among the objects included in the screen, as a display target object.

Referring back to FIG. 4A, the image display apparatus 100 may check whether a display target object is determined, at operation S460.

When the display target object is determined, at operation S470, the image display apparatus 100 may output information on the display target object through the UI output through the display 180. In this regard, it will be described with reference to FIGS. 6A to 7B.

Figure 6A:
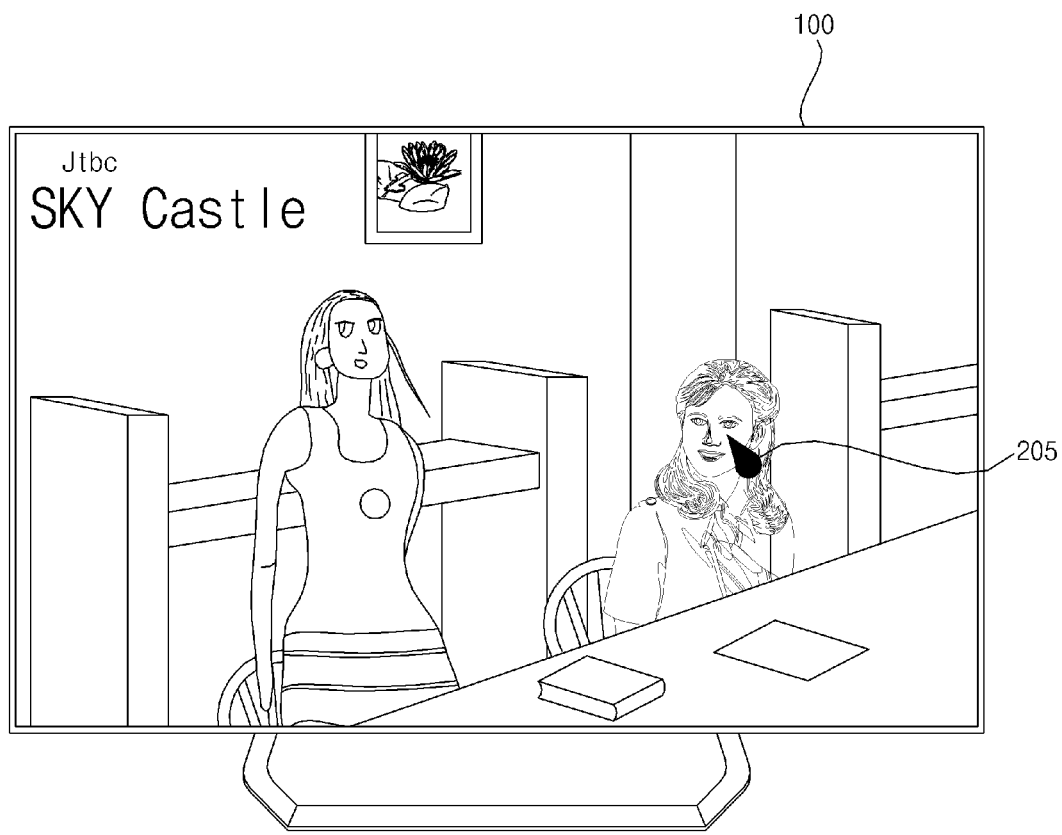
Figure 6B:
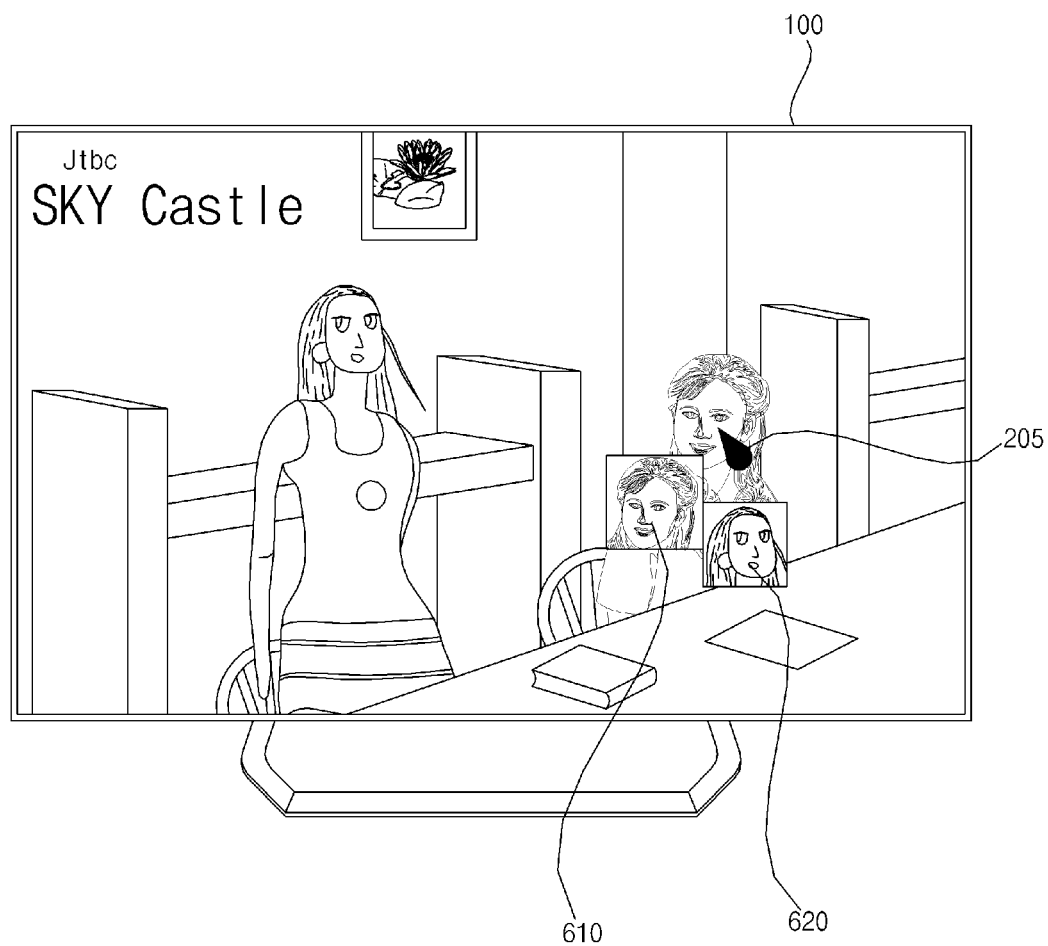

Referring to FIGS. 6A and 6B, while the image display apparatus 100 outputs content through the display 180, after a user moves the pointer 205 corresponding to the remote control device 200 to a position of an object corresponding to a person included in a screen, when a specific button (e.g. home button) provided in the user input unit 230 of the remote control device 200 is pressed for a certain period of time or longer, the image display apparatus 100 may check that an object corresponding to a person exists at a position on a screen corresponding to a user input.

In addition, the image display apparatus 100 may determine all objects corresponding to a person included in a screen as a display target object, and may output a thumbnail image 610, 620 corresponding to each display target object through a UI, among information on display target object. At this time, the image display apparatus 100 may output a UI so that the thumbnail image 610, 620 corresponding to each display target object is disposed adjacent to the pointer 205 corresponding to a user input.

Figure 7A:
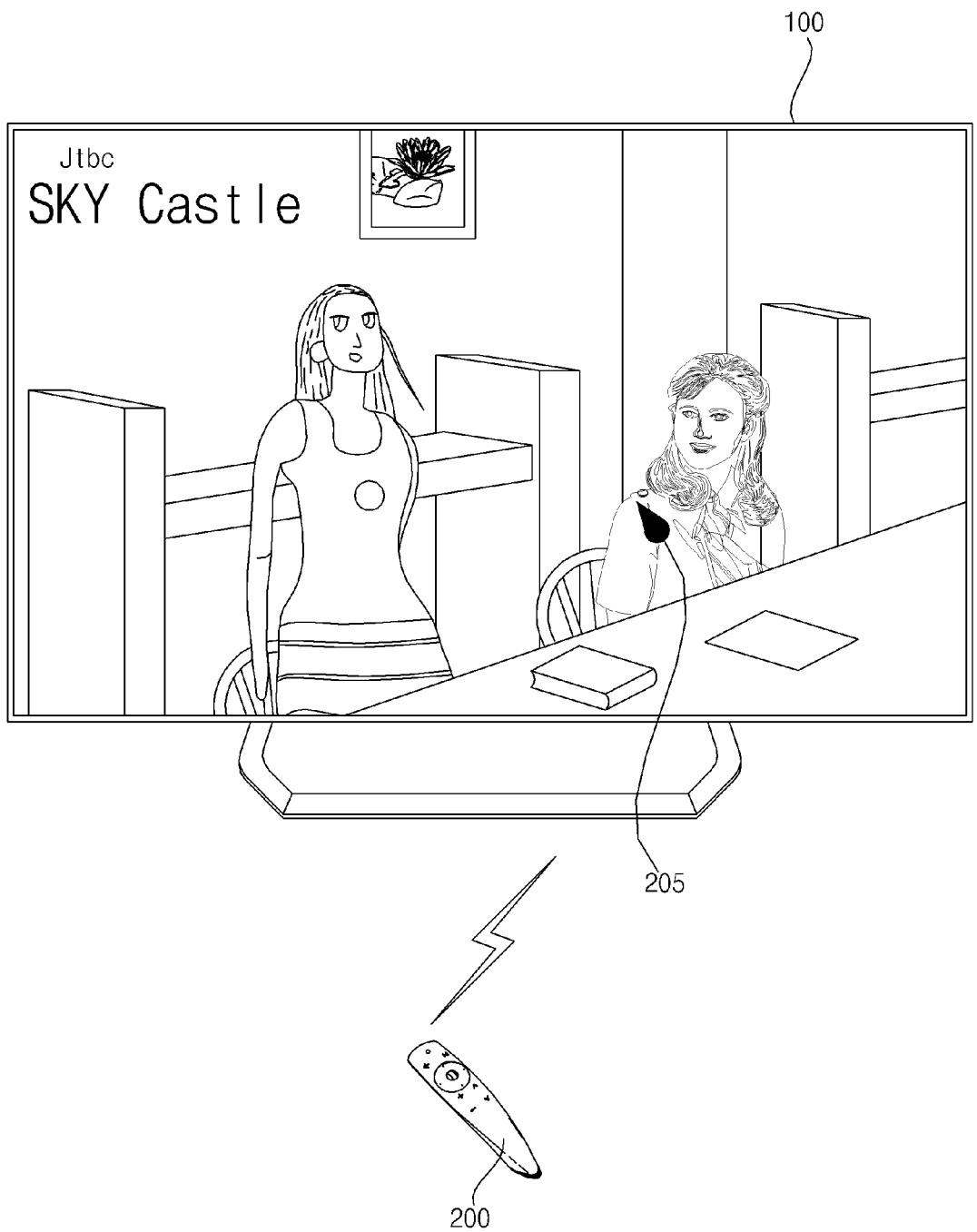
Figure 7B:
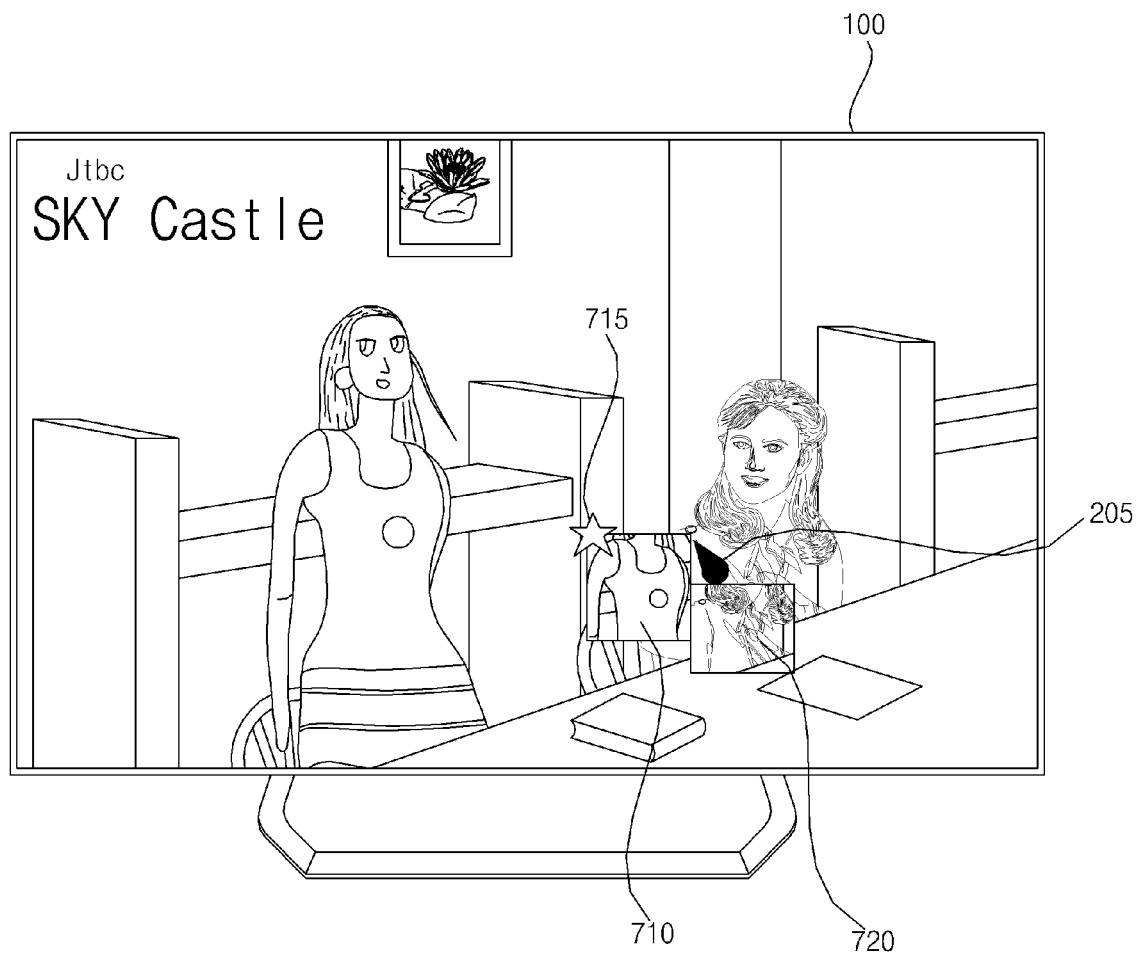
Figure 7B:
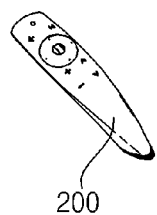

Referring to FIGS. 7A and 7B, while the image display apparatus 100 outputs content through the display 180, after a user moves the pointer 205 corresponding to the remote control device 200 to a position of an object corresponding to the clothing included in a screen, when a specific button (e.g. home button) provided in the user input unit 230 of the remote control device 200 is pressed for a certain period of time or longer, the image display device 100 may check that an object corresponding to clothing exists at a position on a screen corresponding to a user input.

In addition, the image display apparatus 100 may determine all objects corresponding to clothing included in a screen as a display target object, and may output thumbnail image 710, 720 corresponding to each display target object through the UI, among the information on the display target object. At this time, the image display apparatus 100 may output a UI so that the thumbnail image 710, 720 corresponding to each display target object is disposed adjacent to the pointer 205 which is a position corresponding to the user input.

Meanwhile, among display target objects, if an object that is preset to be displayed with emphasis on object data, for example, clothing that is a product promotion target, exists, the image display apparatus 100 may output a UI so that the thumbnail image 710 corresponding to an emphasis display target object is distinguished from the thumbnail image 720 corresponding to a remaining display target object. For example, the image display apparatus 100 may output a thumbnail image 710 corresponding to an emphasis display target object and a symbol 715 indicating the emphasis display target object.

Referring back to FIG. 4A, at operation S480, when display target object is not determined, the image display apparatus 100 may display a list of object included in the screen through the UI output through the display 180. Here, the list of object may mean a list including information, which is included in the data that is related to the object, on objects included in the screen.

That is, if it is determined that no object exists at a position on a screen corresponding to the user input, based on the result of identifying each object included in the screen, the image display apparatus 100 may display a list of object included in the screen, without determining a display target object. In this regard, it will be described with reference to FIGS. 8A and 8B.

Figure 8A:
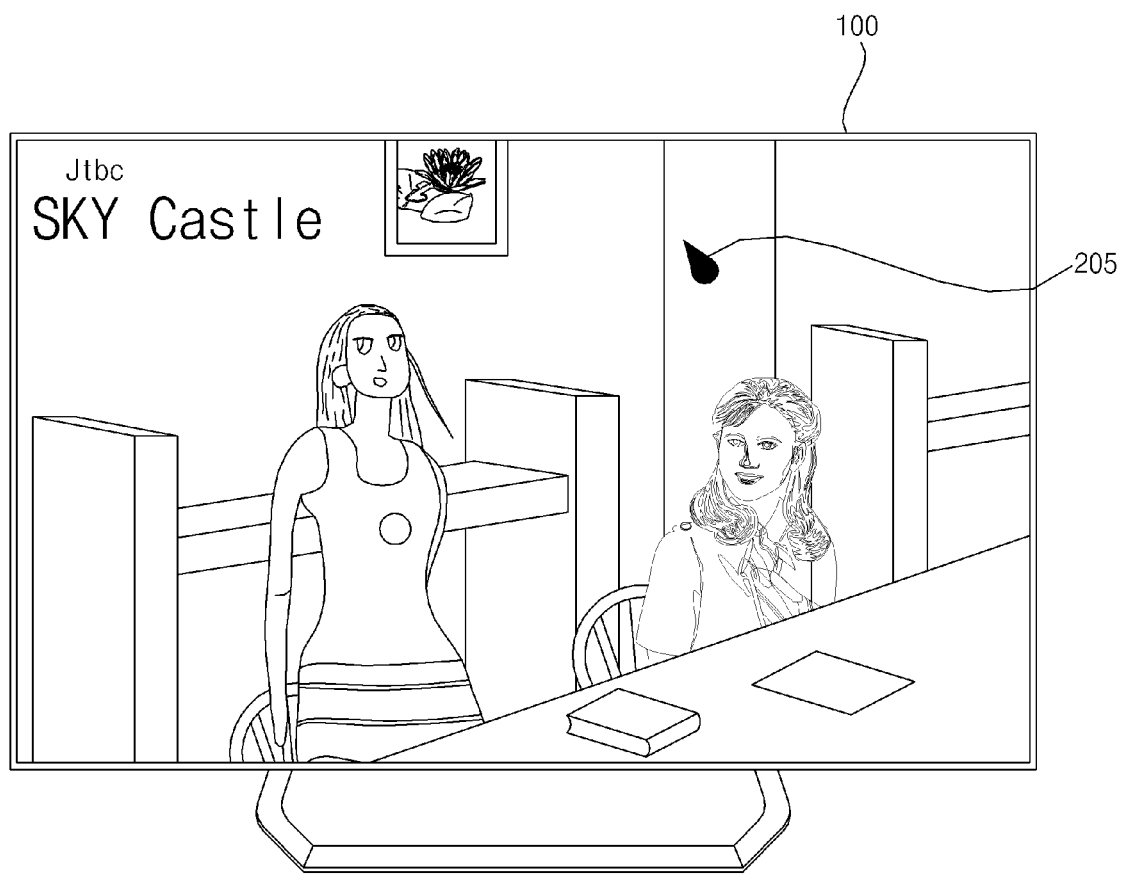
Figure 8B:
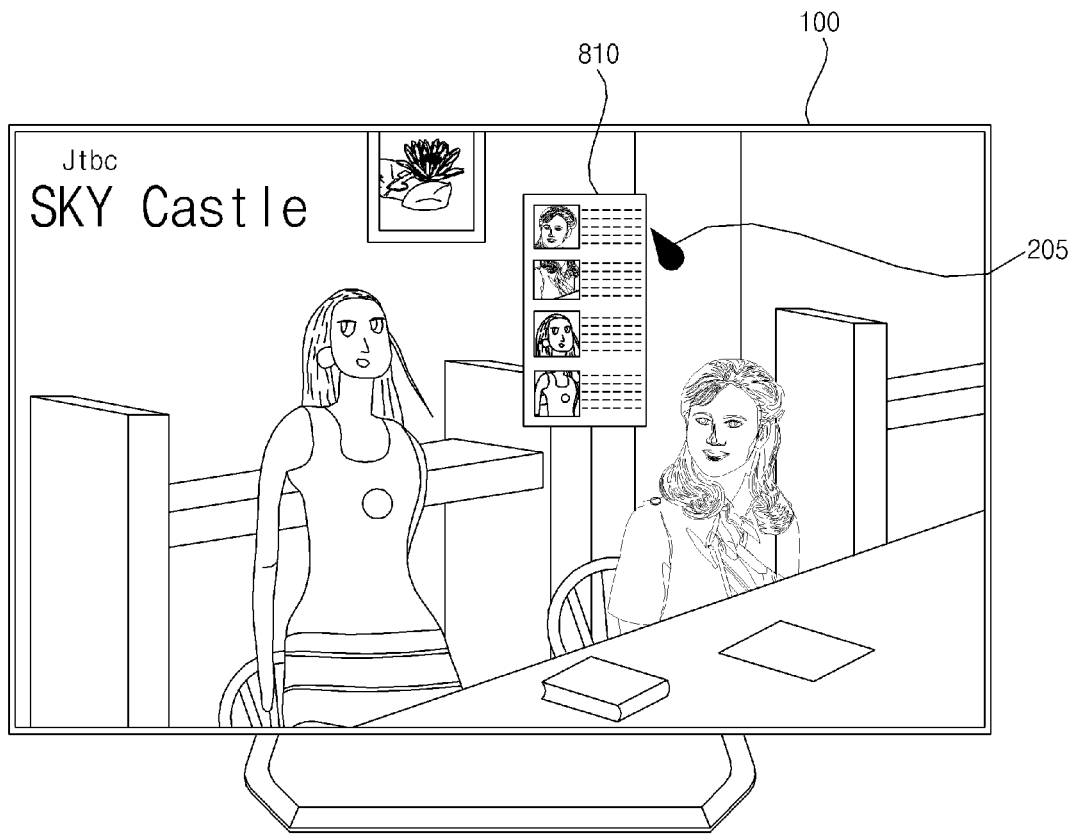
Figure 8B:
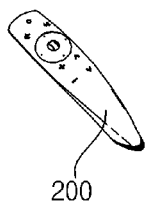

Referring to FIGS. 8A and 8B, while the image display apparatus 100 outputs content through the display 180, after a user moves the pointer 205 corresponding to the remote control device 200 to a position corresponding to the background of a screen, when a specific button (e.g. home button) provided in the user input unit 230 of the remote control device 200 is pressed for a certain period of time or longer, the image display apparatus 100 may determine that the identified object does not exist at a position on a screen corresponding to a user input.

At this time, the image display apparatus 100 may output a UI so that the list 810 of objects is disposed adjacent to the pointer 205 which is a position corresponding to the user input.

As described above, According to various embodiments of the present disclosure, when a user requests information on an object included in a screen at a specific time point, information mapped to a specific time point of the electronic program guide (EPG) is not simply provided, but a hash value of the image corresponding to the screen at a specific time point is generated, and data on object included in the screen is acquired in various ways. Accordingly, even if an error occurs between the time when the content is actually output through the image display apparatus and the time scheduled in the timeline of the electronic program guide (EPG), information on the screen can be provided accurately.

In addition, according to various embodiments of the present disclosure, whenever content is output through an image display apparatus 100, an optimal learning model corresponding to a corresponding content is received from a server 400 and stored, and when a user requests information on an object included on a screen at a specific time point, an object recognition is performed using a learning model corresponding to the corresponding content. Accordingly, information corresponding to the identified object can be quickly provided, and the load of computation for object recognition can be reduced by identifying objects included in the screen more quickly.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Meanwhile, an image display apparatus of the present disclosure and an operation method thereof can also be embodied as a processor readable code on a recording medium readable by a processor provided in the image display apparatus. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. An image display apparatus comprising:
a display;
a network interface unit that performs communication through a network; and
a controller,
wherein the controller is configured to:
capture a screen output through the display, when a preset user input is received while a first content is output through the display,
calculate a hash value corresponding to an image of the captured screen by inputting data of the captured screen to a hash function,
transmit a signal including the hash value to a first server through the network interface unit,
receive data related to objects included in the captured screen from the first server through the network interface unit,
determine at least one first object related to a position corresponding to the user input, among objects included in the screen, based on the received data, and output a user interface (UI) for the at least one first object through the display.

2. The image display apparatus of claim 1, further comprising a storage unit for storing at least one learning model for an object previously learned by using artificial intelligence,
wherein the controller is configured to:
identify each object included in the screen, based on the learning model,
check a second object corresponding to a position corresponding to the user input among object included in the screen, based on a result of identifying each object included in the screen, and
determine an object corresponding to the second object as the first object, among the object included in the data that is related to the object.

3. The image display apparatus of claim 2, wherein the learning model is a learning model learned to identify each type of object included in the screen, wherein the controller is configured to:
check each type of object included in the screen according to the learning model,
check a type of the second object based on a result of checking each type of object included in the screen, and
determine an object corresponding to the type of the second object as the first object, among the object included in the data that is related to the object.

4. The image display apparatus of claim 2, wherein the controller is configured to:
transmit data including an identifier of the first content to a second server through the network interface unit, when the first content is output through the display, and
receive at least one first learning model corresponding to the identifier of the first content from the second server through the network interface unit, and store the at least one first learning model in the storage unit.

5. The image display apparatus of claim 4, wherein the controller is configured to:
transmit data including an identifier of a second content to the second server through the network interface unit, when the second content is output through the display,
receive at least one second learning model corresponding to the identifier of the second content from the second server through the network interface unit, and store in the storage unit, and
delete the first learning model stored in the storage unit.

6. The image display apparatus of claim 5, wherein, when an object included in the screen is not identified based on the learning model, the controller is configured to:
transmit data of an image corresponding to the captured screen to the second server through the network interface unit,
receive data of a result of identifying each object included in the captured screen from the second server, through the network interface unit, and
check the second object among the object included in the screen, based on a result of identifying each object included in the screen received from the second server.

7. The image display apparatus of claim 5, wherein when the second object is not checked based on the learning model, the controller is configured to:
output the UI so that a list of object included in the data that is related to the object is displayed, instead of the first object.

8. The image display apparatus of claim 1, wherein the data that is related to the object received from the first server comprises a thumbnail image corresponding to the object included in the screen,
wherein the controller is configured to output the UI so that a thumbnail image corresponding to each of the at least one first object is disposed adjacent to a position corresponding to the user input.

9. The image display apparatus of claim 8, wherein the controller is configured to:
check whether a third object that is an emphasis display target object exists among the at least one first object, based on the data that is related to the object included in the screen, and
output the UI, when at least one third object exists, so that the third object and a remaining first object excluding the third object are distinguished from each other.

10. A method of operating an image display apparatus, the method comprising:
capturing a screen output through a display of the image display apparatus, when a preset user input is received while a first content is output through the display;
calculating a hash value corresponding to an image of the captured screen by inputting data of the captured screen to a hash function;
transmitting a signal including the hash value to a first server through a network interface unit of the image display apparatus;
receiving data related to objects included in the captured screen from the first server through the network interface unit;
determining at least one first object related to a position corresponding to the user input, among objects included in the screen, based on the received data; and
outputting a user interface (UI) for the at least one first object through the display.

11. The method of claim 10, wherein determining at least one first object comprises:
identifying each object included in the screen, based on a learning model, which is stored in a storage unit of the image display apparatus, for an object previously learned by using artificial intelligence;
checking a second object corresponding to a position corresponding to the user input among object included in the screen, based on a result of identifying each object included in the screen; and
determining an object corresponding to the second object as the first object, among the object included in the data that is related to the object.

12. The method of claim 11, wherein the learning model is a learning model learned to identify each type of object included in the screen,
wherein identifying each object included in the screen comprises checking each type of object included in the screen according to the learning model,
wherein checking a second object comprises checking a type of the second object based on a result of checking each type of object included in the screen, and
wherein determining an object corresponding to the second object as the first object comprises determining an object corresponding to the type of the second object as the first object, among the object included in the data that is related to the object.

13. The method of claim 11, further comprising:
transmitting data including an identifier of the first content to a second server through the network interface unit, when the first content is output through the display; and receiving at least one first learning model corresponding to the identifier of the first content from the second server through the network interface unit, and storing the at least one first learning model in the storage unit.

14. The method of claim 13, further comprising:
transmitting data including an identifier of a second content to the second server through the network interface unit, when the second content is output through the display;
receiving at least one second learning model corresponding to the identifier of the second content from the second server through the network interface unit, and stores in the storage unit; and
deleting the first learning model stored in the storage unit.

15. The method of claim 14, further comprising:
transmitting data of an image corresponding to the captured screen to the second server through the network interface unit; and
receiving data of a result of identifying each object included in the captured screen from the second server, through the network interface unit,
wherein checking a second object comprises checking the second object among the object included in the screen, based on a result of identifying each object included in the screen received from the second server.

16. The method of claim 14, wherein outputting a user interface (UI) comprises outputting the UI so that a list of object included in the data that is related to the object is displayed, instead of the first object, when the second object is not checked.

17. The method of claim 10, wherein the data that is related to the object received from the first server comprises a thumbnail image corresponding to the object included in the screen,
wherein outputting a user interface (UI) comprises outputting the UI so that a thumbnail image corresponding to each of the at least one first object is disposed adjacent to a position corresponding to the user input.

18. The method of claim 17, wherein outputting a user interface (UI) further comprises checking whether a third object that is an emphasis display target object exists among the at least one first object, based on the data that is related to the object included in the screen; and
outputting the UI, when at least one third object exists, so that the third object and a remaining first object excluding the third object are distinguished from each other.

* * * * *